United States Patent Office 2,797,529
Patented July 2, 1957

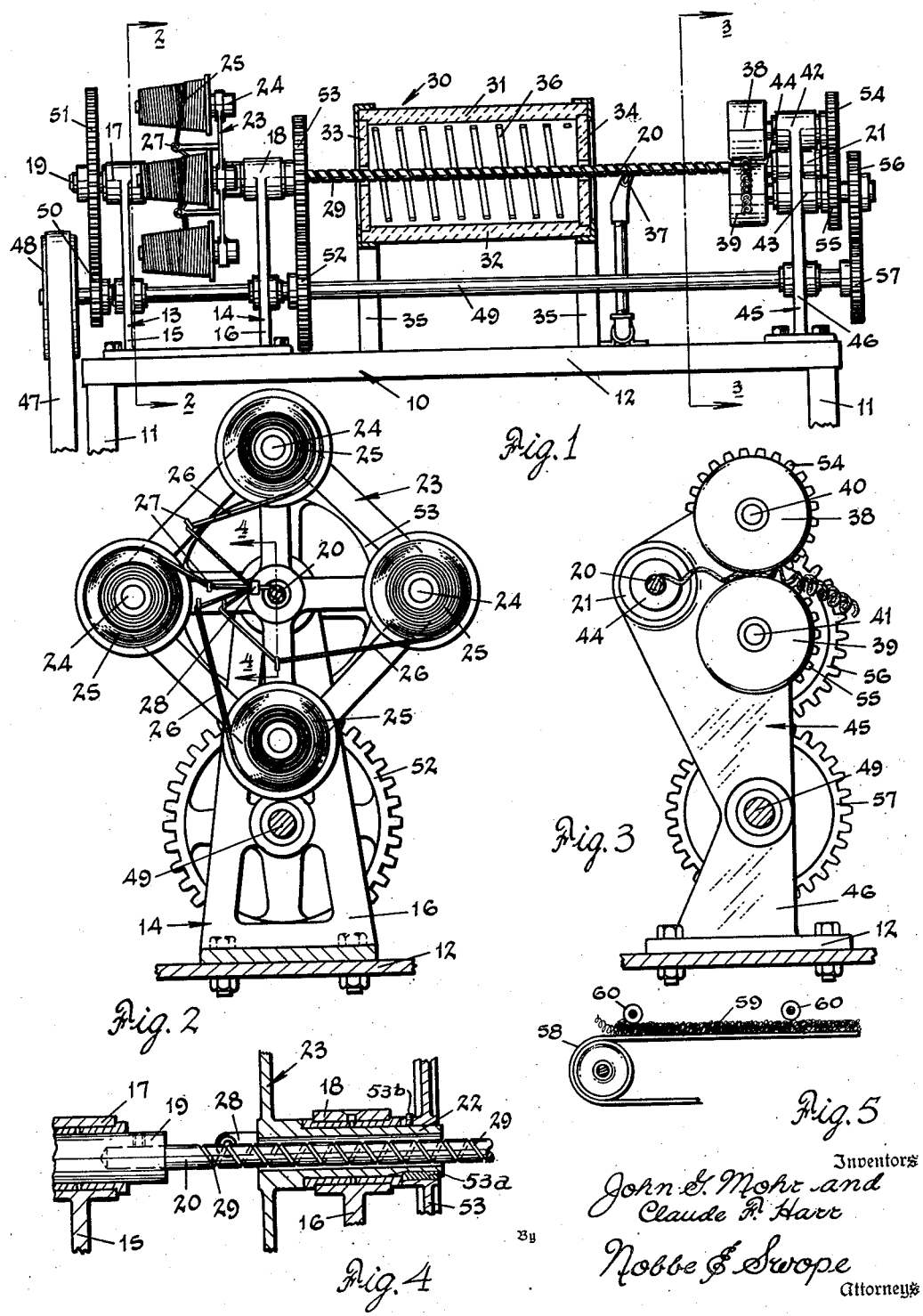

2,797,529

APPARATUS FOR FORMING CURLED GLASS FIBERS

John G. Mohr, Vienna, W. Va., and Claude F. Harr, Toledo, Ohio, assignors, by mesne assignments, to L-O-F Glass Fibers Company, Toledo, Ohio, a corporation of Ohio Application March 19, 1952, Serial No. 277,513

2 Claims. (Cl. 49—7)

The present invention relates broadly to the processing of glass fibers or other heat softenable materials having characteristics similar to glass. More particularly, this invention refers to apparatus for producing a novel permanently curled glass fiber.

An important object of the invention is to provide a fibrous glass product consisting of permanently curled glass fibers arranged in a haphazard manner to produce a product having increased resiliency in all directions, compressibility and lightness in weight.

Another object of the invention is to provide a fibrous glass product consisting of permanently curled glass fibers which by reason of their shape and haphazard arrangement in the product substantially reduce the likelihood of frictional breakage and allow for the formation of a product having a wide variation in insulative density and thickness.

Another object of the invention is the provision of a fibrous glass product consisting of a substantially continuous composite permanently curled glass fiber formed from a plurality of fiber strands of uniform diameter, said composite curled fiber providing a product of more uniform density which is more receptive to secondary sizing.

Another object of the invention is to provide a novel apparatus for imparting a permanent curl to a multiple number of parallelly arranged glass fiber strands, which curl may be performed in a simple, speedy and efficient manner on a variable number of strands of a wide diameter range.

A further object of the invention is to provide a novel apparatus for forming permanently curled fiber glass wherein a plurality of glass fiber strands are caused to assume the diameter and cross sectional shape of a rod which rotates within a heated chamber with the strands wound therearound.

A further object of the invention is the provision of a novel apparatus for forming curled fibrous materials wherein a plurality of substantially continuous glass fiber strands are arranged in parallel relation, wound into a spiral pattern, heated to substantially their point of softening, and then cooled while in a spiral pattern to impart a permanent set thereto.

A still further object of the invention is the provision of novel apparatus for the production of permanently curled fiber glass comprising a rotating grooved rod onto one end of which a plurality of substantially straight glass fiber strands are fed in parallel relation and from the opposite end of which curled composite fibers are removed, said rod rotating within a heated chamber to impart a permanent curl to the fiber strands carried thereon and being suitable for the formation of glass fibers with any desired degree of curl merely by varying the diameter or cross sectional shape thereof.

Other objects and advantages of the invention will become more apparent during the course of the following description when taken in connection with the accompanying drawings.

In the drawings wherein like numerals are employed to designate like parts throughout the same:

Fig. 1 is a side elevational view of apparatus constructed in accordance with this invention;

Figs. 2 and 3 are vertical sections taken substantially along the lines 2—2 and 3—3, respectively, of Fig. 1;

Fig. 4 is a vertical section taken substantially along the line 4—4 of Fig. 2; and Fig. 5 is a fragmentary side view of a forming surface upon which the curled fibers may be collected into mat form.

It will be apparent as this description proceeds that the present invention may be successfully employed in the manufacture of fibers from various types of inorganic or synthetic materials which may be drawn out into fine fibers when in a softened condition. However, the invention has been developed for the particular purpose of processing glass fibers, and accordingly, the method and apparatus is described below in connection with the use of glass as the fibrous material.

With reference now to the drawing, wherein is shown a preferred form of the invention, it will be noted that the reference numeral 10 designates a substantially rectangular framework upon which is supported apparatus for continuously producing permanently curled glass fibers. This framework comprises a plurality of uprights 11 upon the upper ends of which are carried horizontal members 12. Suitably supported upon the upper surface of the framework 10 adjacent one end thereof are mounting brackets 13 and 14 consisting of standards 15 and 16, the upper ends of which are provided with sleeve bearings 17 and 18, respectively.

Rotatively received within the bearing 17 is a stub shaft 19 to which is keyed the fiber forming rod or mandrel 20, the opposite end of said rod being journaled within a bearing 21 carried at the opposite end of the framework 10. As may be seen in Fig. 4, the forming rod 20 is free to rotate within a hub 22, which hub in turn revolves with respect to the sleeve bearing 18 associated with the standard 16.

Forming a part of the hub 22 is a substantially rectangular fiber spider or reel 23, at the corners of which are rotatively carried on suitable shafts 24 the fiber bobbins or spools 25. Any desired number of bobbins may be mounted on the spider depending on the thickness desired for the curled fiber and strands of variable thickness formed of inorganic or resinous materials may be provided on the bobbins for the subsequent forming operation. Preferably, however, strands 26 of glass fibers are drawn from the bobbins 25, passed through suitably located guide eyes 27 carried by the spider 23 and from said eyes are directed through a central guide 28 disposed substantially centrally of the spider 23. As the strands 25 of fibrous glass are passed through the central guide, they are caused to assume a substantially parallel relation with respect to one another, and while in said relation, are directed onto the fiber forming rod 20 for the purpose of subjecting said strands to a heating operation to impart a permanent curl thereto.

The forming rod 20 may be constructed of any suitable temperature resistant metal, such as platinum, or a ceramic material and shaped to any desired diameter or cross section, depending on the design and amount of curl found appropriate to the use intended. The rod 20, shown by way of example, is provided with a continuous groove 29 longitudinally of the rod and extending substantially entirely from one end to the other thereof. By means of this groove the glass fiber strands are caused to conform to the diameter of the rod and assume the curvature of the groove whereby a permanent curl is imparted to said strands as they are subjected to a heating and softening operation. Furthermore, by virtue of the groove 29, the fiber strands after formation will be provided with curls or spirals of substantially equal diameters or circumferences which are relatively equally spaced along the length of the composite fiber. That is to say, each spiral has a substantially uniform diameter and the periphery of each of said spirals is relatively equally displaced from an axis extending lengthwise of the composite fiber and through the center of each spiral.

Substantially intermediate the opposite ends of the framework 10 there is located a substantially rectangular heating chamber 30 comprising a top 31, bottom 32, end walls 33 and 34, and side walls (not shown), the entire structure being supported upwardly of the framework by a plurality of vertical members 35. Suitable openings are provided in the opposite end walls centrally thereof to permit rotation of the forming rod 20, and within the heating chamber there is disposed resistance heating elements 36. Spaced outwardly of one end of the heating chamber 30 and supported upon the framework 10 are quenching means 37. Said means are located beneath the forming rod 20 and function to direct a cooling fluid, such as air, to the softened and reformed glass fibers to impart a permanent set thereto and improve the mechanical strength thereof.

Since glass fibers during their conventional process of formation are provided with an organic binder and/or lubricant to cause adherence and avoid destructive abrasion therebetween, and said substances will normally be burned off or the advantageous properties thereof substantially reduced in the heating and softening operation, it is within the contemplation of this invention to provide binder application means either immediately before or immediately after the quenching means. Any customary means for applying additional binder and/or lubricant to the curled fibers may be employed, and such means may take the form of a spray apparatus, saturated pad, or roller partially immersed in a binder container over which the fibers will pass and be treated.

As may be seen in Fig. 3, there is positioned at one end of the forming rod or mandrel means for removing the curled fibers from the rod and for feeding said fibers to such suitable means as a conveyor, drum, winding bobbin or shipping container. The herein provided means for removing the curled fibers comprises a pair of resilient rollers 38 and 39 mounted in vertical alignment with respect to one another and spaced forwardly of the forming rod whereby said rod is horizontally aligned with the space provided between the rollers. That is to say, the forming rod and rollers are arranged in a triangular formation with the rollers forming the base of the triangle and the rod being the apex of the triangle. By such an arrangement the curled fiber glass will feed normally off the forming rod 20 and between the resilient drawing rollers 38 and 39 in a substantially straight path and perpendicular to said rod, thereby diminishing the likelihood of breakage of the fibers during the drawing off or removing operation.

The rollers 38 and 39, which may be formed of a resilient material such as sponge rubber or layers of soft felt, are carried by stub shafts 40 and 41 rotatively journaled in sleeve bearings 42 and 43, while the forming rod 20 is keyed to another stub shaft 44 which rotates within the bearing 21 referred to previously. Said latter bearing and the bearings 42 and 43 for the rollers 38 and 39 are carried by the standard 45 provided by the mounting bracket 46 supported upon the framework 10.

Power to operate the above described mechanism is provided by a suitable motor (not shown) and transferred to the mechanism by a belt 47 which is trained over a pulley 48 carried on one end of a power shaft 49. Also carried by said shaft and located adjacent said pulley is a gear wheel 50 which meshes with a gear wheel 51 on the stub shaft 19. As was noted above, and is shown in Fig. 4, the latter shaft is keyed to the forming rod 20, and consequently, upon rotation and engagement of the gear wheels 50 and 51, the forming rod will be caused to rotate.

Also carried by the power shaft 49, and spaced inwardly of the gear wheel 50 and also the mounting bracket 14, is an additional gear wheel 52 which meshes with a gear wheel 53 mounted thereabove. As may also be seen in Fig. 4, the latter gear wheel 53 is keyed to the hub 22, of which the fiber spider 23 forms a part, by means of a bar key 53a and set screw 53b. Thus, when the gear wheel 53 is caused to rotate by its association with the wheel 52 and power shaft 49, the spider will revolve about the rotating forming rod 20 in a clockwise direction.

It will be noted by reference to Fig. 1 that the gear wheels 51, 52 and 53 are of substantially the same diameter, whereas the gear wheel 50 is of relatively smaller diameter. This arrangement provides a ratio of 1:2 between the pair of gear wheels 50 and 51 and the gear wheels 52 and 53 whereby the forming rod or mandrel 20 will rotate at a speed approximately one-half the speed of rotation of the fiber spider 23, depending of course on the pitch of the groove and other related factors. By so gearing the spider with respect to the forming rod, the fibrous strands 26 will be evenly drawn from the bobbins 25 on the spider 23 at a uniform speed by the forming rod and any possibility of the rod drawing more strands onto itself than it can efficiently feed into the continuous groove 29 is rendered remote. Efficient operation of the mechanism and avoidance of breakage of the fiber glass are thereby capable of successful accomplishment.

Synchronization of the means for applying the glass fibers to the forming rod and the means for removing the fibers therefrom is herein accomplished by the provision of gear wheels 54 and 55 on the stub shafts 40 and 41, respectively, of the resilient rollers 38 and 39 and the further provision of a gear wheel 56 on the stub shaft 41 which meshes with a gear wheel 57 on the power shaft 49. Thus, when power is transferred to latter shaft 49 and transmitted thereby to the gear wheel 52 which causes rotation of the gear wheel 53, the spider 23 will revolve, and after the strands 26 have been started on the forming rod 20, additional fiber strands will be fed onto said rod at a uniform continuous rate. At the same time, power will be transferred to the gear wheel 57 on the opposite end of the power shaft 49, and by the meshing of this wheel with the gear wheel 56, the stub shaft 41 will rotate and cause the gear wheel 55 to rotate and by engagement of this wheel with the gear wheel 54 thereabove, both stub shafts 40 and 41 will revolve and cause rotative movement of the resilient rollers 38 and 39. Thereby, the curled strands will be removed from the forming rod 20 at the same speed as the relatively straight strands are applied to said rod by the spider 23.

In the operation of the hereinabove described invention, spools or bobbins 25 containing glass fiber strands 26 of the desired diameter and twist are positioned on the spider 23 and the free or loose end of each continuous strand fed through the guide eyes 27 and then through the central guide 28. As the fibers are drawn through this latter guide they are arranged in a substantially parallel relation and the end of the group of strands is wound in a clockwise direction for a short distance into the continuous groove 29 on the forming rod. Power is then applied to the apparatus and the forming rod 20 will be caused to rotate in a clockwise direction, while at the same time, the spider will revolve about the rod and continuously feed additional fiber strands onto the rod in a clockwise manner.

As the rod rotates the strands which are wound therearound will travel along the continuous groove and pass into the heated chamber 30 wherein the temperature is maintained at a temperature of approximately 1400° F. At this temperature the fibers will soften and assume the diameter of the rod and the curl provided by the continuous groove. While in this softened condition said fiber strands will pass from the chamber along the grooves and will then be subjected to a rapid cooling provided by the quenching means. By this cooling a permanent set will be imparted to the curled fibers and the strength thereof substantially increased, whereupon the curled fibers will be directed between the resilient rollers 38 and 39 and drawn perpendicularly from the rotating forming rod 20 by said oppositely turning rollers.

Suitable means for collecting the permanently curled fibers may be provided beneath the rollers 38 and 39 and such means may comprise a moving conveyor, rotating collecting spool, or drum or bag for shipping said fibers. Thus, for example, there may be spaced below said take-off rollers a conveyor 58 onto which the curled glass fibers descend and upon which a mat 59 possessing the hereinbelow described characteristics and advantages may be formed. As the curled fibers descend and contact the conveyor, the curls will engage one another in an interlocking yet loose relation. For the purpose of compressing the mat during formation, and thereby causing a more firm intertwining of the curls, there may be provided, if desired, rollers 60 beneath which the mat 59 may be passed and which may be caused to reciprocate to assure the maximum amount of interlocking.

Curled fibers produced in accordance with the above described invention possess a resiliency, compressibility and lightness in weight which renders them particularly suitable for farbrication into resilient mats for insulative and plastic laminate applications. By virtue of the curl imparted to the fibers there will be an interlocking engagement between adjacent curls and this will provide substantially increased strength of the mat in all directions, a characteristic particularly valuable in the reinforcement of resinous materials.

As a thermal or acoustical insulative medium the novel curled fibers of this invention provide in mat form a product having increased density and thickness. Due to the curly nature of the fiber there will be an intertwining among the fibers and a consequent compactness which will improve the insulative qualities of the product. Further, and in contrast to a mat composed of straight fibers, a greater amount of curly fibers may be incorporated in a mat with little if any increase in weight of the finished mat, and yet at the same time, a mat of greater thickness may be provided with superior insulative characteristics to mats presently produced by conventional methods.

In addition, due to the interlacing or interlocking arrangement of the curly fibers when in mat form, and the consequent loose relation in which the fibers are maintained in the mat, the likelihood of frictional breakage caused by abrasion between the fibers is reduced, and further, due to the voids in the mat, secondary sizing or binding may more readily be applied.

Not only may the curled fibers be successfully used for various insulative purposes and for plastic reinforcement, but such fibers have important applications in other reinforcement uses and for padding such as seat cushions.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. Apparatus for forming curled glass fibers comprising, a frame, a rotatable reel supported upon the frame and adapted to support a supply of glass fibers, a rotatable forming rod operatively associated with the reel and provided with a spiral groove into which glass fibers from the reel are adapted to be wound, a heating chamber through which said rod extends, cooling means adjacent the exit end of the heating chamber, and means for removing curled fibers from the rod.

2. Apparatus for forming curled glass fibers comprising, a frame, a rotatable reel supported upon the frame and adapted to support a supply of glass fibers, a rotatable forming rod operatively associated with said reel and provided with a spiral groove, guide means positioned on the reel for collecting glass fibers and directing the fibers in parallel relation into said groove, means for rotating the reel and rod in the same direction but at different speeds to advance the fibers along said rod, a heating chamber through which the rod extends, cooling means adjacent the exit end of the heating chamber, and a pair of rotatable resilient rollers for removing curled fibers from the rod.

References Cited in the file of this patent

UNITED STATES PATENTS

| | | |
|---|---|---|
| 2,021,276 | Weinhart | Nov. 19, 1935 |
| 2,224,149 | Fisher | Dec. 10, 1940 |
| 2,296,321 | Wellech | Sept. 22, 1942 |
| 2,313,296 | Lamesch | Mar. 9, 1943 |
| 2,313,630 | Dockerty | Mar. 9, 1943 |
| 2,363,826 | Yellin | Nov. 28, 1944 |
| 2,388,401 | Freundlich | Nov. 6, 1945 |
| 2,399,260 | Taylor | Apr. 30, 1946 |
| 2,416,390 | Hitt | Feb. 25, 1947 |
| 2,428,653 | Collins | Oct. 7, 1947 |
| 2,485,979 | McCandless et al. | Oct. 25, 1949 |
| 2,541,728 | Wahl | Feb. 13, 1951 |
| 2,553,358 | Cobel | May 15, 1951 |

FOREIGN PATENTS

| | | |
|---|---|---|
| 159,545 | Austria | Sept. 25, 1940 |